E. H. EWERTZ.
SLED.
APPLICATION FILED JAN. 20, 1917.

1,270,276.

Patented June 25, 1918.

Inventor:
Eric H. Ewertz
By his attorney

UNITED STATES PATENT OFFICE.

ERIC H. EWERTZ, OF WOLLASTON, MASSACHUSETTS.

SLED.

1,270,276.  Specification of Letters Patent.  Patented June 25, 1918.

Application filed January 20, 1917. Serial No. 143,435.

*To all whom it may concern:*

Be it known that I, ERIC H. EWERTZ, a citizen of the United States, residing at Wollaston, in the county of Norfolk and State of Massachusetts, have invented new and useful Improvements in Sleds, of which the following is a specification.

This invention relates to a sled which may be operated by placing one foot upon the platform of the sled and propelling the same by the other foot of the user, a convenient handle being used whereby the sled may be steered, which handle also supplies a means for preserving the equilibrium of the user.

The sled consists, essentially, of a platform with two runners, one in alinement with the other, the rear runner being fast to said platform and the front runner being pivoted thereto by means of a pivot which extends through the platform and upwardly to a substantial distance above said platform, said pivot constituting the handle which is grasped by the user for the purpose of steering the sled and for the purpose of preserving his equilibrium. Said sled is further provided with a foot-hold which serves to position the foot of the user upon the platform of the sled.

The invention consists in the combination and arrangement of parts set forth in the following specification and particularly pointed out in the claims thereof.

Referring to the drawings.

Like numerals refer to like parts throughout the several views of the drawings.

Figure 3:
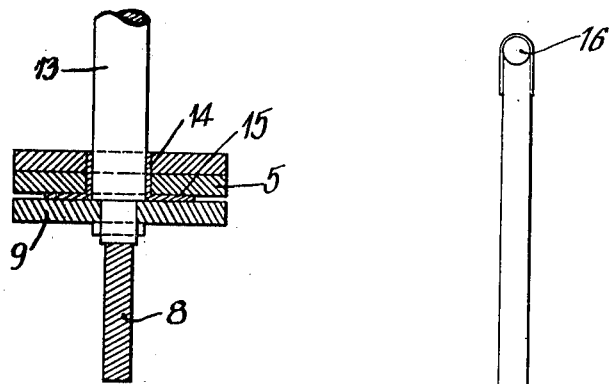
Fig. 3 is an enlarged sectional elevation taken on line 3—3 of Fig. 2.
Figure 1:
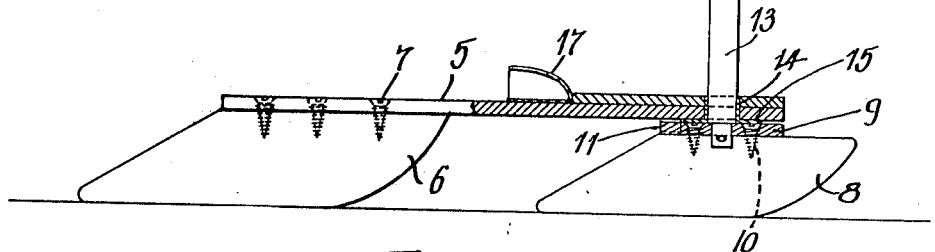
Figure 1 is a side elevation, partly in section, of my improved sled.

In the drawings, 5 is the platform, 6 the rear runner fastened by screws 7 to said platform and 8 is the front runner which has a flange 9 fast thereto by screws 10, said flange 9 having a rearward projection 11 thereon which plays to and fro between stops 12 fast to the under side of the platform 5. A pivot 13 is fastened at its lower end to the front runner 8 and extends upwardly thereabove through the flange 9 and through a sleeve 14 which has upon its lower end a flange 15.

Figure 2:
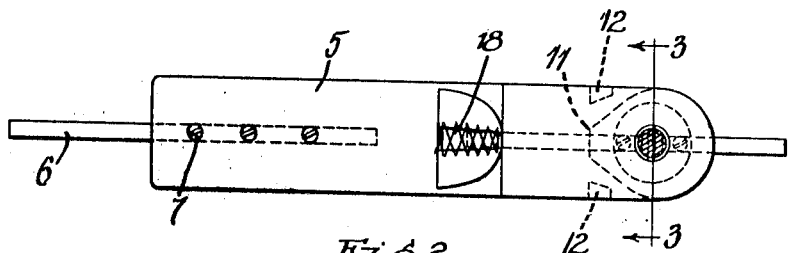
Fig. 2 is a plan view of the same.

The flange 9 upon the front runner 8 bears against the under face of the flange 15 on the sleeve 14 and the lower end of the pivot 13 where it projects through the flange 9 is made rectangular in cross section (see Fig. 2). The pivot 13 extends upwardly to a substantial extent above the platform 5 and is provided at its upper end with a cross-bar 16.

A foot-hold 17 is fastened to the upper surface of the platform 5 and is preferably formed of leather and divided longitudinally along the top portion thereof and provided with lacings 18 whereby the foot-hold may be adjusted to fit different sizes of feet.

The operation of the device hereinbefore specifically described is as follows: The user grasps the cross-bar 16 with both hands, places the toe of one foot in the foot-hold 17 and then propels the sled by means of the other foot. To steer the sled the user turns the handle and by this means turns the front runner 8 in any direction desired. A limit to the angle of rotation of the front runner is provided by the stops 12 against which the rearward extension 11 of the flange 9 abuts when the front runner has been turned to the extreme angle which may be desired in any case.

Having thus described my invention, what I claim and desire by Letters Patent to secure is:

1. A sled having, in combination, a platform, a rear runner fast to said platform, a front runner in alinement with said rear runner, a sleeve extending through said platform and having a cylindrical flange at its lower end, a flange fast to the upper edge of said front runner and bearing against substantially the entire under surface of said flange and a pivot fast to said front runner, extending through said sleeve and upwardly thereabove to a substantial distance and constituting a handle whereby said front runner may be rotated.

2. A sled having, in combination, a platform, a rear runner fast to said platform, a front runner in alinement with said rear runner, a sleeve extending through said platform and having a cylindrical flange at its lower end, a flange fast to the upper edge of said front runner and bearing against substantially the entire under surface of said flange, the flange on said front runner having a rearward extension, a pivot fast to said front runner, extending through said sleeve and upwardly thereabove to a substantial distance and constituting a handle whereby said front runner may be rotated, and a pair of stops fast to said platform and adapted to be engaged by said rearward extension.

3. A sled having, in combination, a platform constituting a foot rest, a rear runner fast to said platform, a front runner in alinement with said rear runner, a pivot fast to said front runner, extending through said platform and upwardly thereabove to a substantial distance and constituting a handle whereby said front runner may be rotated and a foot-hold fast to the upper surface of said platform foot rest and in alinement with each of said runners whereby one foot of the user may be positioned upon said platform.

In testimony whereof I have hereunto set my hand in presence of two subscribing witnesses.

ERIC H. EWERTZ.

Witnesses:
NELLIE G. LAUE,
ALICE M. LAUE.

Copies of this patent may be obtained for five cents each, by addressing the "Commissioner of Patents, Washington, D. C."